United States Patent
Mori (10) Patent No.: US 9,829,681 B2
(45) Date of Patent: Nov. 28, 2017

(54) OPTICAL SYSTEM AND IMAGE PICKUP APPARATUS INCLUDING THE SAME

(71) Applicant: CANON KABUSHIKI KAISHA, Tokyo (JP)

(72) Inventor: Takeo Mori, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 168 days.

(21) Appl. No.: 14/700,275

(22) Filed: Apr. 30, 2015

(65) Prior Publication Data
US 2015/0323764 A1   Nov. 12, 2015

(30) Foreign Application Priority Data

May 8, 2014 (JP) ................. 2014-096597

(51) Int. Cl.
*G02B 13/00* (2006.01)
*H04N 5/225* (2006.01)
(Continued)

(52) U.S. Cl.
CPC ......... *G02B 13/0045* (2013.01); *G02B 13/26* (2013.01); *G02B 15/14* (2013.01);
(Continued)

(58) Field of Classification Search
CPC .... G02B 13/0045; G02B 13/26; G02B 15/14; G02B 15/20; G02B 15/177; H04N 5/2253; H04N 5/2254
(Continued)

(56) References Cited

U.S. PATENT DOCUMENTS 4,437,732 A *  3/1984  Ishiyama ............. G02B 15/173
                                                             359/683
4,591,244 A     5/1986  Aono et al.
(Continued)

FOREIGN PATENT DOCUMENTS

CN    101587233 A    11/2009
EP      2124082 A1   11/2009
(Continued)

OTHER PUBLICATIONS

European Search Report issued in corresponding application No. 15001294.6 dated Sep. 29, 2015.
(Continued)

*Primary Examiner* — Jordan Schwartz
*Assistant Examiner* — George G King
(74) *Attorney, Agent, or Firm* — Carter, DeLuca, Farrell & Schmidt, LLP (57) ABSTRACT

Provided is an optical system, which retains enhanced optical performance at any object distance, and has compact and light-weight focus lens units. Provided is an optical system including a plurality of lens units, in which an interval between adjacent lens units changes during focusing, the optical system including: a positive lens unit arranged closest to an object side; first and second focus lens units having negative refractive powers configured to move during focusing; and an intermediate lens unit having a positive refractive power and arranged between the first and second focus lens units. The first and second focus lens units are configured to move toward an image side during focusing.

11 Claims, 7 Drawing Sheets

(51) Int. Cl.
   *G02B 15/14*    (2006.01)
   *G02B 13/26*    (2006.01)
   *G02B 15/20*    (2006.01)
   *G02B 15/173*   (2006.01)

(52) U.S. Cl.
   CPC .......... *G02B 15/173* (2013.01); *G02B 15/20* (2013.01); *H04N 5/2253* (2013.01); *H04N 5/2254* (2013.01)

(58) Field of Classification Search
   USPC ............... 359/684, 746, 757–759, 763–769, 359/771–773
   See application file for complete search history.

(56) References Cited

U.S. PATENT DOCUMENTS

| | | | |
|---|---|---|---|
| 4,824,226 A | | 4/1989 | Tanaka |
| 4,896,950 A | * | 1/1990 | Endo .................... G02B 15/173 359/683 |
| 5,757,554 A | | 5/1998 | Fukami |
| 2004/0017605 A1 | * | 1/2004 | Kasahara ............... G02B 13/02 359/362 |
| 2009/0290232 A1 | * | 11/2009 | Hagiwara ............ G02B 15/173 359/695 |
| 2012/0314291 A1 | * | 12/2012 | Kogo ................... G02B 15/173 359/557 |
| 2013/0188091 A1 | | 7/2013 | Hara |
| 2013/0229565 A1 | * | 9/2013 | Hatakeyama ........ G02B 15/173 348/345 |

FOREIGN PATENT DOCUMENTS

| | | |
|---|---|---|
| JP | 2006-153942 A | 6/2006 |
| JP | 2011-048232 A | 3/2011 |

OTHER PUBLICATIONS

Chinese Office Action issued in corresponding application No. 201510221687.6 dated May 25, 2017.

* cited by examiner

OPTICAL SYSTEM AND IMAGE PICKUP APPARATUS INCLUDING THE SAME

BACKGROUND OF THE INVENTION

Field of the Invention

The present invention relates to an optical system and an image pickup apparatus including the same, which are suitable for, for example, an image pickup optical system used in an image pickup apparatus such as a digital still camera, a digital video camera, a television (TV) camera, a monitoring camera, a silverhalide film camera, or the like.

Description of the Related Art

It is desired that an image pickup optical system used in an image pickup apparatus retain, during focusing, reduced aberration variation and enhanced optical performance at any object distance, and have compact and light-weight focus lens units, which facilitate high-speed focusing. Focus types typically employed, for the image pickup optical system include an inner focus type where part of the lens units in the image pickup optical system works for focusing. The inner focus type more easily enables downsizing and reduction in weight of the lens units for focusing (focus lens units) and facilitates high speed focusing, compared with some other focus types where all the components of the image pickup optical system are required to be moved.

In general, in the image pickup optical system, a shorter photographing distance develops various aberrations more. Especially, when an object being photographed is at so close range as an image-to-object ratio is approximately 1, various aberrations are significantly increased, resulting in deteriorated optical performance. A photographing lens primarily used for photographing the object at short distance is known as "macro lens". In Japanese Patent Application Laid-Open No 2006-153942 and Japanese Patent Application Laid-Open No 2011-048232, there is disclosed an image pickup optical system of a floating type where two or more of the lens units are configured to move during the focusing to reduce the variations in aberrations due to the focusing.

In Japanese Patent Application Laid-Open No. 2006-153942, there is disclosed an image pickup optical system consisting of our lens units, namely, a first positive lens unit, a second negative lens unit, a third positive lens unit, and a fourth negative lens unit arranged in the stated order from the object side to the image side. For focusing from an object at infinity to an object at short distance, the second lens unit is moved toward the image side while the third lens unit is moved toward the object side.

In Japanese Patent Application Laid-Open No. 2011-048232, there is disclosed an image pickup optical system consisting of six lens units, namely, a first positive lens unit, a second negative, lens unit, a third positive lens unit, a fourth positive lens unit, a fifth negative lens unit, and a sixth positive lens unit arranged in the stated order from the object side to the image side. For focusing from an object at infinity to an object at short distance, at least three lens units are moved.

In general, in focusing of the inner focus and the floating type, it is important to appropriately set the refractive power and the configuration of each of the lens units of the image pickup optical system. Especially, it is important to appropriately select which of the plurality of the lens units are to be moved as floating lens elements.

Unless those factors are appropriately specified, there arise difficulties in making the focus lens units more compact and lighter in weight, reducing the variations in aberrations during the focusing, and obtaining enhanced optical performance for focusing at any object distance from an object at infinity to an object at short distance.

SUMMARY OF THE INVENTION

An optical system according to one embodiment of the present invention includes a plurality of lens units, in which an interval between adjacent lens units changes during focusing, the optical system including: a positive lens unit arranged closest to an object side; a first focus lens unit having a negative refractive power and a second focus lens unit having a negative refractive power configured to move during focusing; and an intermediate lens unit having a positive refractive power and arranged between the first focus lens unit having the negative refractive power and the second focus lens unit having the negative refractive power, in which the first focus lens unit having the negative refractive power and the second focus lens unit having the negative refractive power are configured to move toward an image side during focusing on from an object at infinity to an object at short distance.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Now, an optical system and an image pickup apparatus including the same according to the present invention are described. According to the present invention, there is provided an optical system including a plurality of lens units, in which an interval between adjacent lens units changes during focusing. Among all of the plurality of lens units, the lens unit having a positive refractive power is arranged closest to an object side. Further, the optical system includes focus lens units LF1 and LF2 each having a negative refractive power, which are moved during the focusing, and an intermediate lens unit having a positive refractive power, which is arranged between the two focus lens units.

Figure 1A:
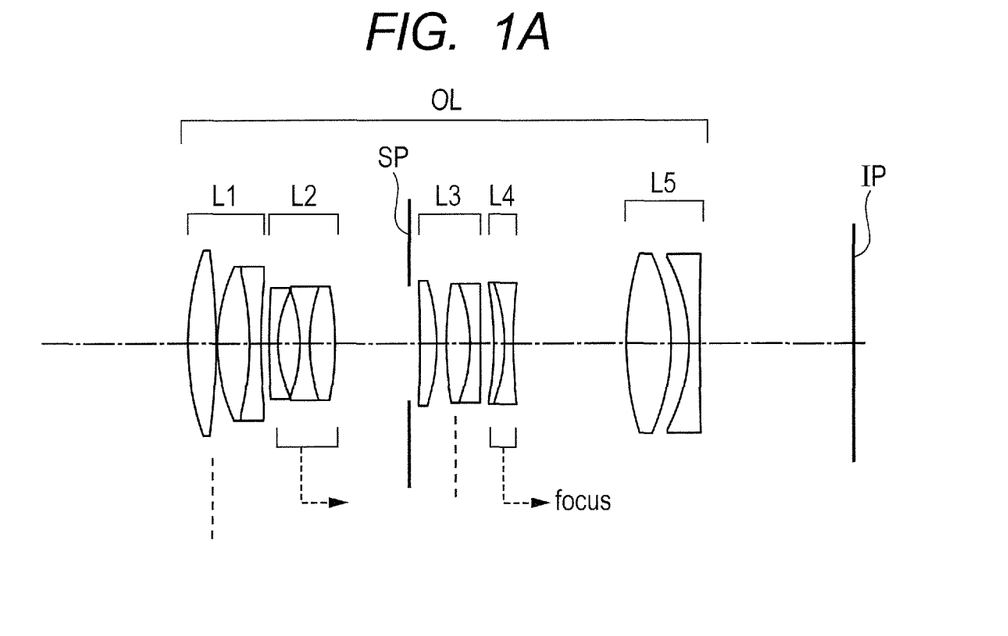
FIG. 1A is a lens cross-sectional view when focusing on an object at infinity according to Embodiment 1 of the present invention.
Figure 1B:
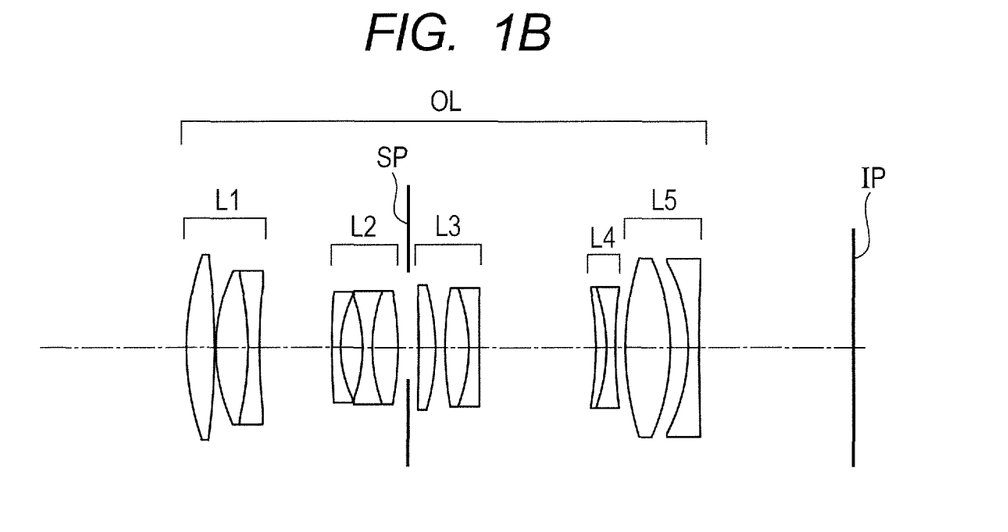
FIG. 1B is a lens cross-sectional view when focusing on an object at short distance according to Embodiment 1.
Figure 2A:
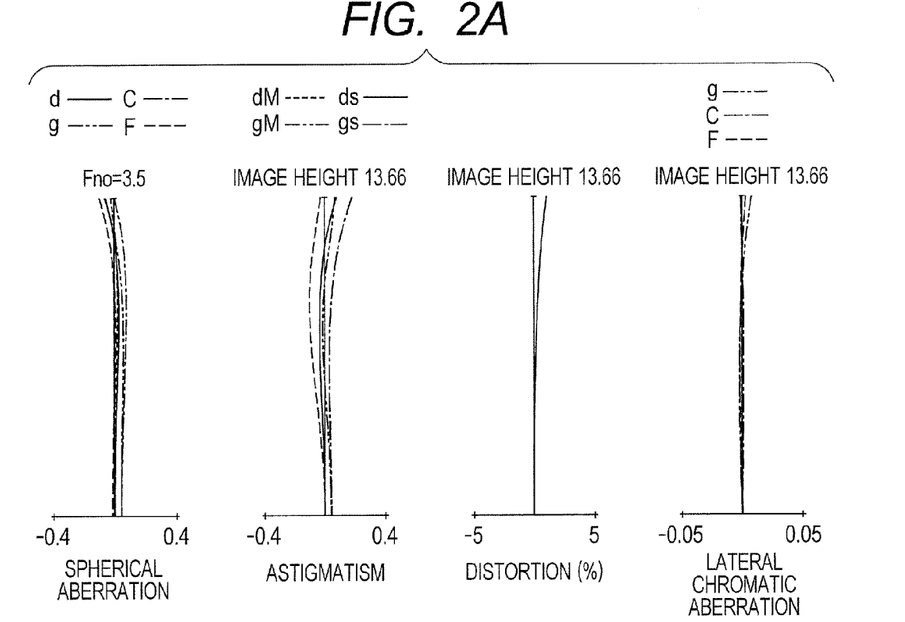
FIG. 2A is an aberration diagram when focusing on an object at infinity according to Embodiment 1.
Figure 2B:
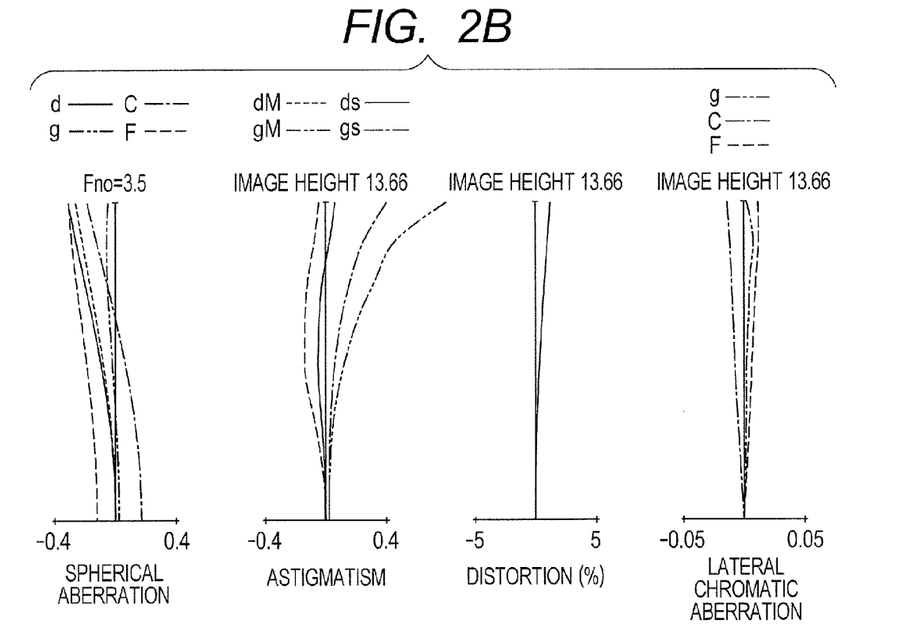
FIG. 2B is an aberration diagram when focusing on an object at short distance according to Embodiment 1.

FIGS. 1A and 1B are lens cross-sectional views of the optical system according to Embodiment 1 of the present invention when focus is at an object of infinity and short distance, respectively. FIGS. 2A and 2B are longitudinal aberration diagrams of the optical system according to Embodiment 1 when focus is at the object of infinity and short distance, respectively. Embodiment 1 is an optical system having an angle of field of 28.52 degrees and an F-number of about 3.5.

Figure 3A:
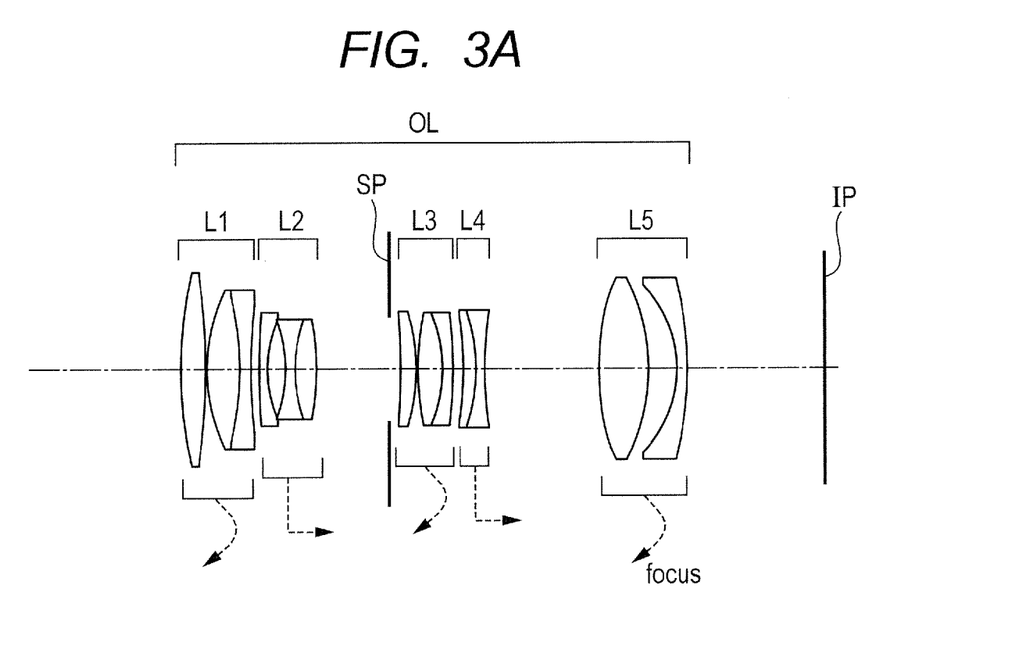
FIG. 3A is a lens cross-sectional view when focusing on an object at infinity according to Embodiment 2 of the present invention.
Figure 3B:
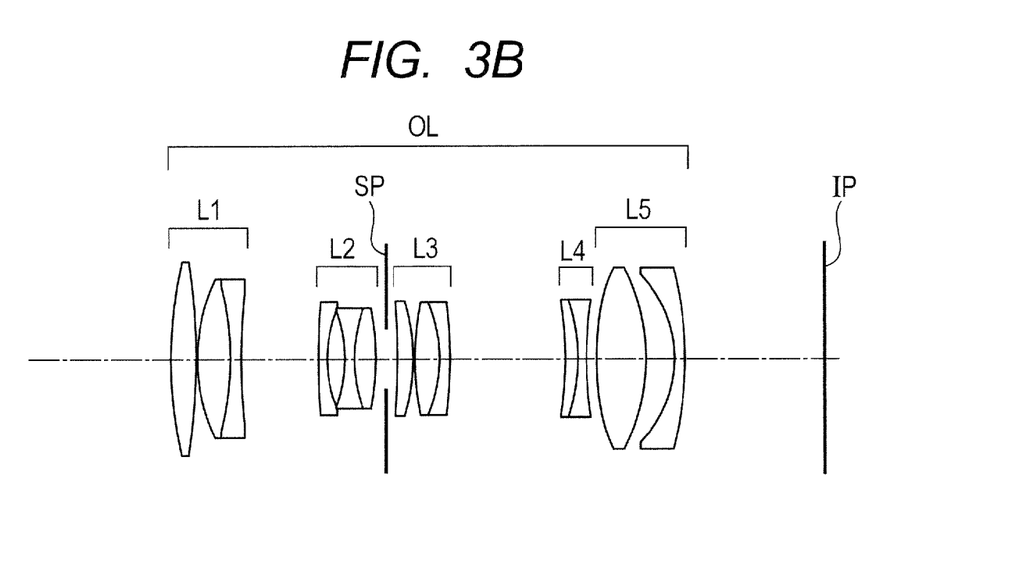
FIG. 3B is a Lens cross-sectional view when focusing on an object at short distance according to Embodiment 2.
Figure 4A:
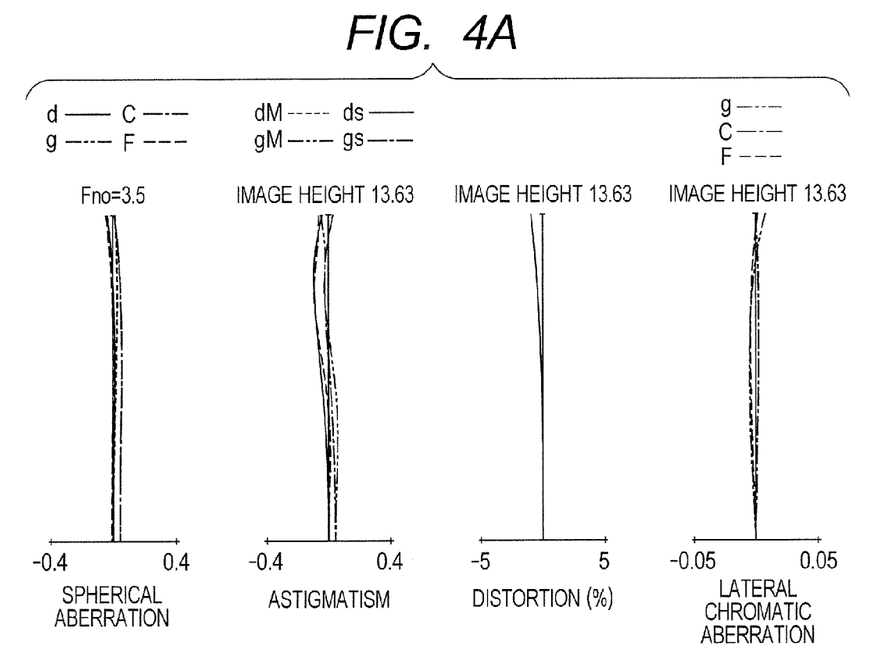
FIG. 4A is an aberration diagram when focusing on an object at infinity according to Embodiment 2.
Figure 4B:
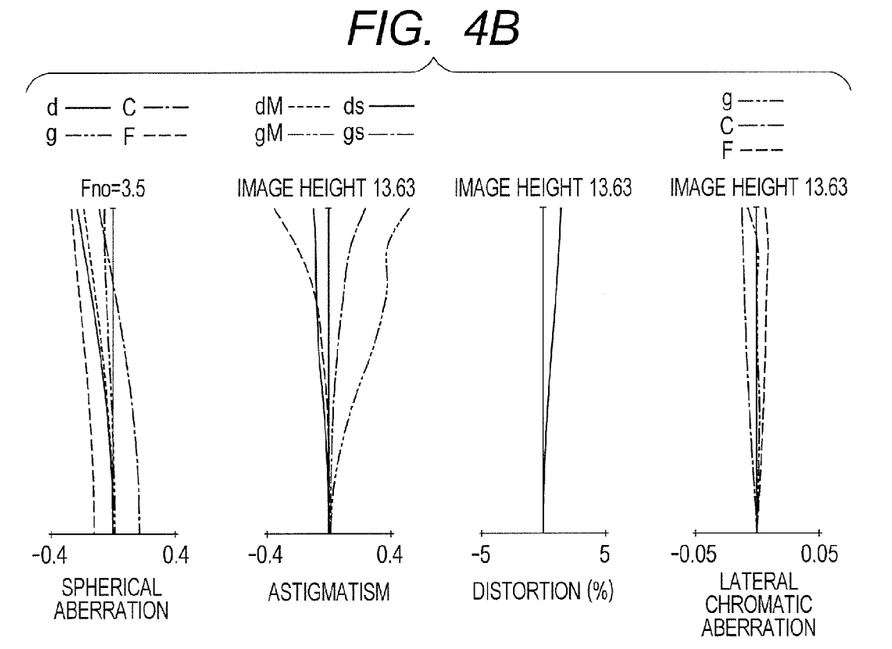
FIG. 4B is an aberration diagram when focusing on an object at short distance according to Embodiment 2.

FIGS. 3A and 3B are lens cross-sectional views of the optical system according to Embodiment 2 of the present invention when focus is at the object of infinity and short distance, respectively. FIGS. 4A and 4B are longitudinal aberration diagrams of the optical system according to Embodiment 2 when focus is at the object of infinity and short distance, respectively. Embodiment 2 is an optical system having an angle of field of 32.82 degrees and an F-number of about 3.5.

Figure 5A:
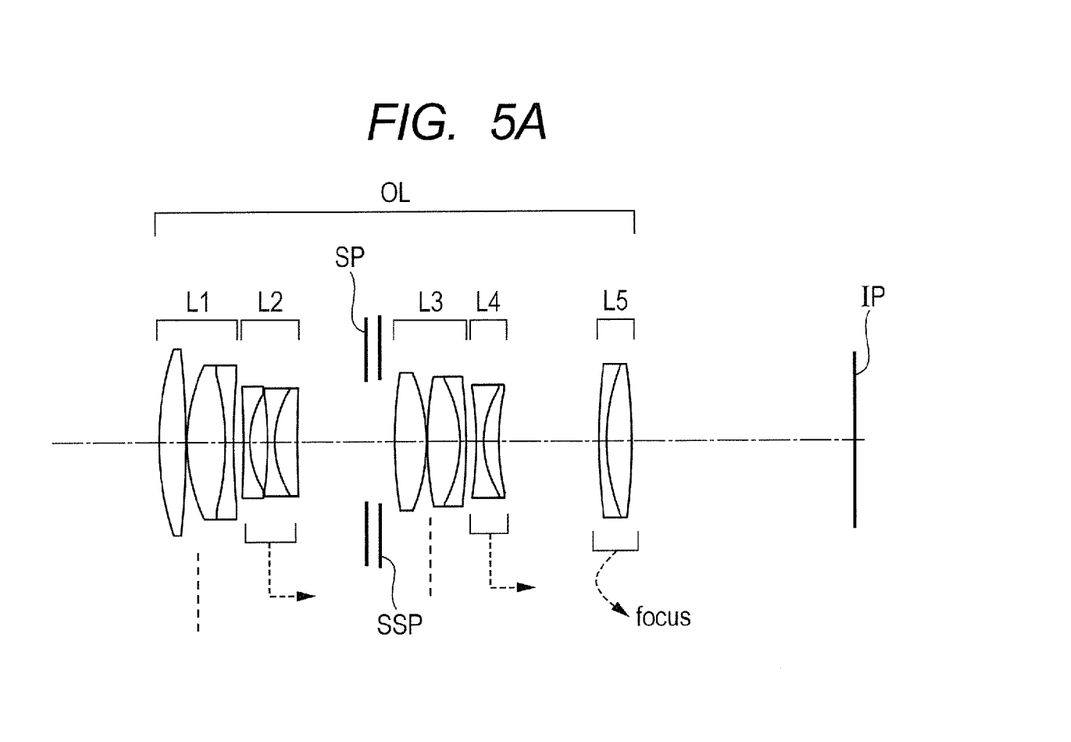
FIG. 5A is a lens cross-sectional view when focusing on an object at infinity according to Embodiment 3 of the present invention.
Figure 5B:
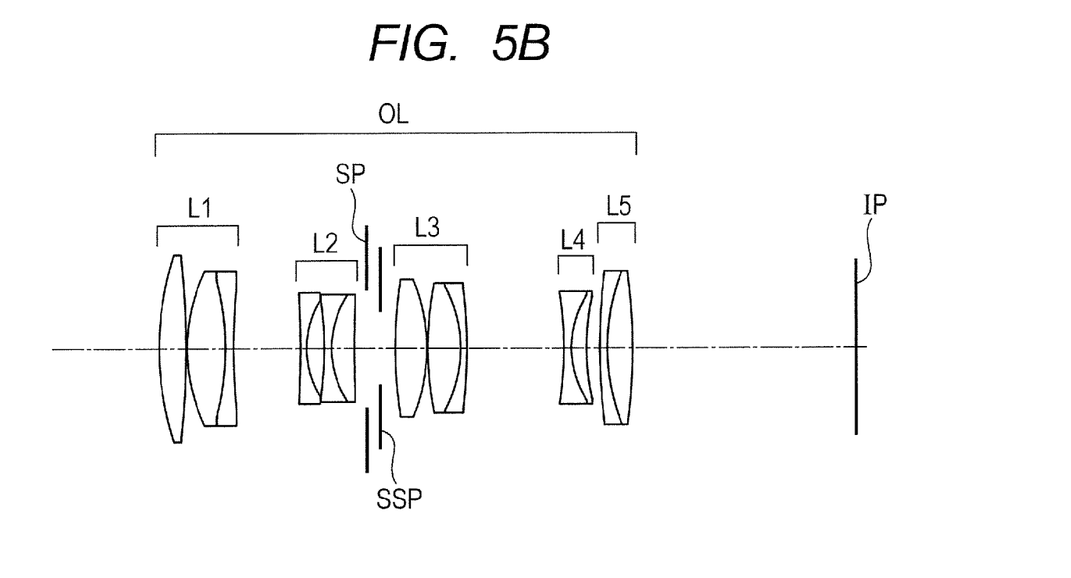
FIG. 5B is a lens cross-sectional view when focusing on an object at short distance according to Embodiment 3.
Figure 6A:
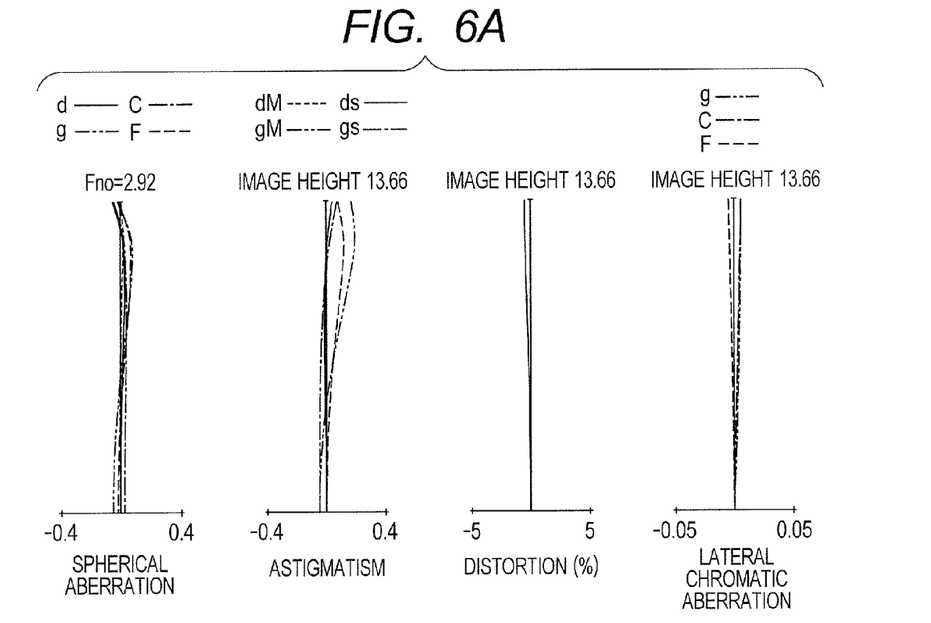
FIG. 6A is an aberration diagram when focusing on an object at infinity according to Embodiment 3.
Figure 6B:
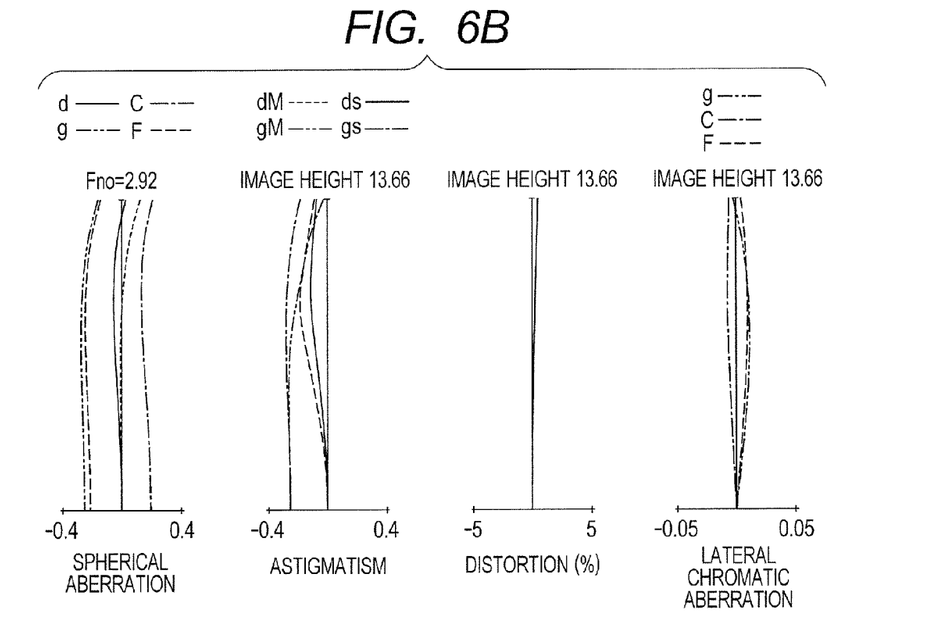
FIG. 6B is an aberration diagram when focusing on an object at short distance according to Embodiment 3.

FIGS. 5A and 5B are lens cross-sectional views of the optical system according to Embodiment 3 of the present invention when focus is at the object of infinity and short distance, respectively. FIGS. 6A and 6B are longitudinal aberration diagrams of the optical system according to Embodiment 3 when focus is at the object of infinity and short distance, respectively. Embodiment 3 is an optical system having an angle of field of 26.44 degrees and an F-number of about 2.92.

Figure 7:
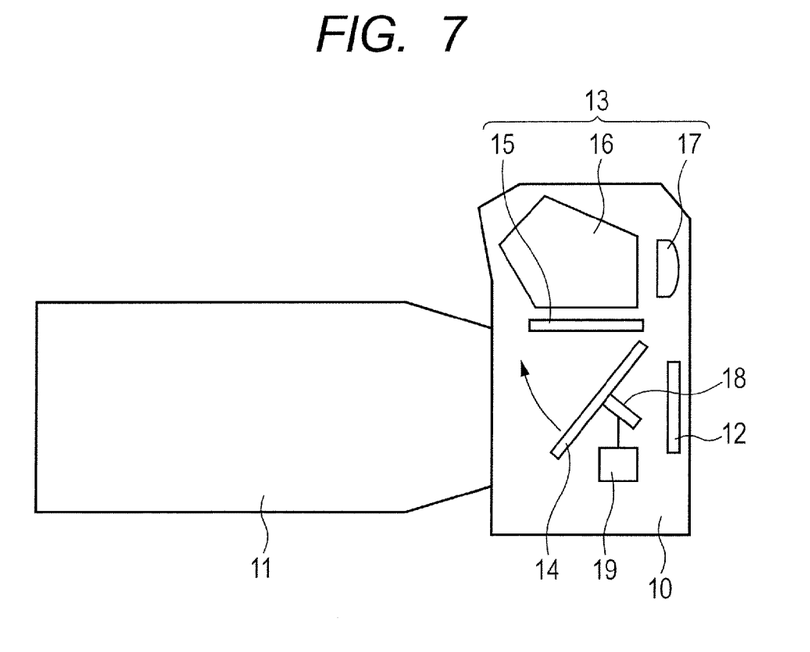
FIG. 7 is a schematic view illustrating a main part of an image pickup apparatus according to the present invention.

FIG. 7 is a schematic view illustrating a main part of an image pickup apparatus according to the present invention. On each of the lens cross-sectional views, the left is an object side (front side, magnifying side), whereas the right is an image side (rear side, reducing side). In the lens cross-sectional views, the optical system is represented by OL.

A first lens unit L1 has a positive refractive power, a second lens unit L2 has a negative refractive power, a third lens unit has a positive refractive power, a fourth lens unit has a negative refractive power, and a fifth lens unit has a positive refractive power. The lens units according to the present invention are separated from each other depending on the change in intervals between the lens units during the focusing. Any of the lens units may have at least a single lens instead of necessarily consisting of at least one lens.

The optical system includes an aperture stop SP and an auxiliary stop SSP with a fixed aperture ratio (flare-cut stop). Movement loci followed by the lens units during the focusing from an object at infinity to an object at short distance are expressed by the arrows with the description "focus". An image plane IP corresponds to an image pickup plane of a solid-state image pickup element (photoelectric conversion element) such as a CCD sensor or a CMOS sensor when used as an imaging optical system of a video camera or a digital still camera, and corresponds to a film plane when used for a silver-halide film camera. In a spherical aberration diagram, symbols d, g, C, and F represent the d-line, the g-line, the C-line, and the F-line, respectively.

In an astigmatism diagram, symbol dM represents a meridional image plane on the d-line, symbol dS represents a sagittal image plane on the d-line, symbol pM represents a meridional image plane on the g-line, and symbol gS represents a sagittal image plane on the g-line. In a lateral chromatic aberration diagram, symbols g, C, and F represent the g-line, the C-line, and the F-line, respectively. Symbol Fno represents an F-number. In any of Embodiments, at least two of the lens units having negative refractive powers (focus lens units LF1 and LF2) are configured to move for focusing.

The intermediate lens unit having a positive refractive power is arranged between the focus lens units LF1 and LF2. In the optical system according to the present invention, the intermediate lens unit is arranged in the vicinity of the aperture stop SP so as to reduce an effective aperture of the intermediate lens unit. In addition, incident beams are converged by the intermediate lens unit having a positive refractive power so as to enable a reduction in dimensions of the focus lens unit LF2 that is to be arranged on the image side of the intermediate lens unit. As a result, the focus lens units can be effectively reduced in dimensions and weight, The following conditional expressions are satisfied;

$$-0.80 < mn1/fn1 < -0.22 \tag{1}$$

$$-0.80 < mn2/fn2 < -0.22 \tag{2}$$

where fn1 and fn2 represent focal lengths of the focus lens units LF1 and LF2, respectively, and mn1 and mn2 represent movement amounts for focusing on from an object at infinity to an object at short distance of the focus lens units LF1 and LF2, respectively.

The "movement amount" described herein is a difference in axial distance from a position of each of the focus lens units when the optical system is in focus at infinity to another position of the focus lens unit when the optical system is in focus on an object at short distance. As to the mathematical symbol to express a plus or minus for the movement amount, positive is used when the position of the focus lens unit that is in focus on an object at short distance is on the image side of the position of the focus lens unit that is in focus on an object at infinity.

The conditional expressions (1) and (2) relate to the movement amounts and focal lengths of the focus lens units LF1 and LF2, respectively. As absolute values of the refractive powers (i.e., negative refractive powers) of the focus lens units LF1 and LF2 are reduced to such an extent that the ratios mn1/fn1 and mn2/fn2 exceed the upper limits defined in the conditional expressions (1) and (2), the movement amounts of the focus lens units during the focusing are increased, thereby increasing the entire length of the lens. As the absolute values of the refractive powers (i.e., negative refractive powers) of the focus lens units LF1 and LF2 are increased to such an extent that the ratios mn1/fn1 and mn2/fn2 are smaller than the lower limits defined in the conditional expressions (1) and (2), the variations in various aberrations developed in the optical system are increased to prevent the optical system from retaining satisfactory optical performance.

It is preferred to set the numerical range of the conditional expressions (1) and (2) as follows:

$$-0.60 < mn1/fn1 < -0.30 \tag{1a}$$

$$-0.60 < mn2/fn2 < -0.30 \tag{2a}$$

It is more preferred that at least one of the conditional expressions is satisfied. It is preferred that at least one of the following conditional expressions is satisfied.

$$0.2 < fp/finf < 2.0 \quad (3)$$

$$1.0 < fn1/finf < -0.2 \quad (4)$$

$$1.0 < fn2/finf < -0.2 \quad (5)$$

$$1.0 \beta inf1/\beta mod1 < 10.0 \quad (6)$$

$$1.0 < \beta inf2/\beta mod2 < 10.0 \quad (7)$$

$$0.1 < f1/finf < 1.0 \quad (8)$$

where fp represents a focal length of the intermediate lens unit, finf represents a focal length of the optical system when being in-focus on an object at infinity, βinf1 and βinf2 represent lateral magnifications of the focus lens units LF1 and LF2 when being in-focus on an object at infinity, respectively, βmod1 and βmod2 represent lateral magnifications of the focus lens units LF1 and LF2 when being in-focus on an object at short distance, respectively and f1 represents a focal length of the positive lens unit arranged closest to the object side.

The technical significance of the conditional expressions is described below. The conditional expression (3) relates to the focal length of the intermediate lens unit arranged between the two focus lens units LF1 and LF2. When the positive power of the intermediate lens unit decreases to such an extent that the ratio fp/finf exceeds the upper limit defined in the conditional expression (3), the intermediate lens converges the incident beams with the accordingly reduced power, thereby increasing the focus lens units LF1 and LF2 in dimensions. When the positive power of the intermediate lens unit increases to such an extent that the ratio fp/finf is smaller than the lower limit defined in the conditional, expression (3), the variations in aberrations developed during the focusing are increased, and it is difficult to sufficiently compensate for various aberrations.

The conditional expressions (4) and (5) relate to he focal lengths of the focus lens units LF1 and LF2, respectively. When the negative powers of the focus lens units LF1 and LF2 increase to such an extent that the upper limit conditions of the conditional expressions (4) and (5) are not satisfied, it is difficult to sufficiently compensate for various aberrations. When the negative powers of the focus lens units LF1 and LF2 decrease to such an extent that the lower limit conditions of the conditional expressions (4) and (5) are not satisfied, the movement amounts of the focus lens units during the focusing are increased, thereby increasing the entire length of the lens.

The conditional expressions (6) and (7) relate to the lateral magnifications of the focus lens units LF1 and LF2 each having a negative refractive power. When the variations in lateral magnifications increase to such an extent that the ratios βinf1/βmod1 and βinf2/βmod2 exceed the upper limits defined in the conditional expressions (6) and (7), it is difficult to sufficiently compensate for various aberrations. When the variations in lateral magnifications decrease to such an extent that the ratios βinf1/βmod1 and βinf2/βmod2 are smaller than the lower limits defined in the conditional expressions (6) and (7), the movement amounts of the focus lens units during the focusing are increased, thereby increasing the optical system as a whole in dimensions.

The conditional expression (8) relates to the focal length of the first lens unit L1 having a positive refractive power and arranged closest to the object side. When the ratio f1/finf exceeds the upper limit defined in the conditional expression (8), the first lens unit L1 converges the incident beams with the accordingly reduced refractive power, thereby increasing the entire length of the optical system. When the refractive power of the first lens unit L1 is excessively intense to such an extent that the ratio f1/finf is smaller than the lower limit defined in the conditional expression (8), the various aberrations developed in the optical system are increased to prevent the optical system from obtaining satisfactorily enhanced optical performance. It is preferred to set the numerical range of the conditional expressions (3) to (8) as follows:

$$0.3 < fp/finf < 0.5 \quad (3a)$$

$$0.40 < fn1/finf < -0.25 \quad (4a)$$

$$0.80 < fn2/finf < -0.40 \quad (5a)$$

$$1.0 < \beta inf1/\beta mod1 < 3.9 \quad (6a)$$

$$1.0 < \beta inf2/\beta mod2 < 3.9 \quad (7a)$$

$$0.4 < f1/finf < 0.63 \quad (8a).$$

As has been described so far, Embodiments of the present invention can of reduce the variations in various aberrations developed during the focusing from an object at infinity to an object at short distance in which an image-to-object ratio is approximately 1.

The optical system according to Embodiments consists of, in order from the object side to the image side, a first lens unit L1 having a positive refractive power, a second lens unit L2 having a negative refractive power, a third lens unit L3 having a positive refractive power, a fourth lens unit L4 having a negative refractive power, and a fifth lens unit L5 having a positive refractive power. The second and fourth lens units L2 and L4 are the focus lens units, which are configured to move toward the image side for the focusing from an object at infinity to an object at short distance. In such a situation, the second and fourth lens units L2 and L4 are configured to move with different loci during the focusing.

The features of the lens configuration of the optical system according to each of Embodiments of the present invention are described below. Each of Embodiments employs a focus type where the second and fourth lens units L2 and L4 each having a negative refractive power are moved toward the image side for the focusing from an object at infinity to an object at short distance. The configuration of arranging the third positive lens unit (i.e., the intermediate lens unit) L3 in the vicinity of the aperture stop SP reduces the effective aperture of the third positive lens unit L3. In addition, converging the incident beams by the third positive lens unit L3 facilitates the downsizing of the fourth lens unit L4. Further, the second and fourth lens units L2 and L4 are configured to satisfy the conditional expression (1).

In the optical system according to Embodiments 1 to 3, at least the second and fourth lens units L2 and L4 are moved toward the image side for the focusing from an object at infinity to an object at short distance. In Embodiment 1, the first, third, and fifth lens units L1, L3, and L5 are configured so as not to move during the focusing. The second and fourth lens units L2 and L4 alone are configured to move toward the image side for the focusing from an object at infinity to an object at short distance.

In Embodiment 2, the first, third, and fifth lens units L1, L3, and L5 are configured to move along a locus convex toward the image side during the focusing from an object at infinity to an object at short distance. Further, the second and fourth lens units L2 and L4 are configured to move toward, the image side for the focusing from the object at infinity to an object at short distance.

In Embodiment 3, the first and third lens units L1 and L3 are configured so as not to move during the focusing. The second and fourth lens units L2 and L4 are configured to move toward the image side and the fifth lens unit L5 is configured to move along a locus convex toward the object side for the focusing from an object at infinity to an object at short distance.

Next, an embodiment of a single-lens reflex camera system (image pickup apparatus) including the optical system according to the present invention is described below. Referring to FIG. 7, the camera system includes a single-lens reflex camera body 10, an interchangeable lens 11 having the optical system according to the present invention mounted therein, a memory unit 12, such as a film or an image pickup element for recording an image of (receiving light from) an object formed by the interchangeable lens 11, a viewfinder optical system 13 used to see the image of the object formed by the interchangeable lens 11, and a quick return mirror 14 that pivots so as to selectively guide the beams from the interchangeable lens 11 to the memory unit 12 and the viewfinder optical system 13.

When observing the image of the object through a viewfinder, the image of the object is reflected by the quick return mirror 14 and imaged on a focusing glass 15, and is inverted into an erect image by a penta prism 16. Then, the erect image is enlarged by an ocular optical system 17. During photographing, the quick return mirror 14 pivots in a direction indicated by the arrow to form and store the image of the object in the memory unit 12. A sub-mirror 18 and a focal point detecting device 19 are also provided.

In this way, applying the optical system of the present invention to the image pickup apparatus such as the interchangeable lens of the single-lens reflex camera achieves the image pickup apparatus that facilitates the imaging of enhanced optical performance at any object distance. Note that, the present invention can also be similarly applied to a camera without the quick return mirror.

Next, Numerical Embodiments 1 to 3 corresponding to Embodiments 1 to 3 of the optical system according to the present invention are shown below. In Numerical Embodiments 1 to 3, symbol i represents a surface number counted from the object side. Symbol ri represents a radius of curvature of the i-th lens surface in the order from the object side, symbol di represents a lens thickness or an air interval between the i-th surface and an (i+1)th surface, and symbols ndi and υdi represent a refractive index and an Abbe constant in the d-line of a lens material between the i-th surface and the (i+1)th surface counted from the object side, respectively. The description of "variable" replaced with an actual value of the interval between adjacent lens surfaces refers to an amount by which the object distance (magnification of photography) changes The aspherical surface is expressed by the following expression:

$$x=(h^2/r)/[1+\{1-(1+K)\times(h/r)^2\}^{1/2}]+A4\times h^4+A6\times h^6+A8\times h^8+A10\times h^{10}$$

where light progresses in a plus direction, x represents an axial shift amount from the apex of the aspherical surface, h represents a height from the optical axis in a direction orthogonal to the optical axis, r represents a paraxial radius of curvature, K represents a conic constant, and A4, A6, A8, and A8 represent aspherical surface coefficients.

Further, "E±XX" in the numerical values means "×10±XX". Further, the relation between the individual conditional expressions described above and the Numerical Embodiments is shown in Table 1. In Table 1, Li indicates the lens unit between the i-th surface and an (i+1)th surface.

(Numerical Embodiment 1)

Unit: mm

Surface data

| Surface number | r | d | nd | υd |
|---|---|---|---|---|
| 1 | 32.481 | 3.23 | 1.65160 | 58.5 |
| 2 | −79.222 | 0.15 | | |
| 3 | 21.104 | 3.68 | 1.62299 | 58.2 |
| 4 | −34.926 | 1.30 | 1.84666 | 23.8 |
| 5 | 71.129 | (Variable) | | |
| 6 | 98.063 | 1.00 | 1.83400 | 37.2 |
| 7 | 13.481 | 2.53 | | |
| 8 | −17.717 | 1.10 | 1.76200 | 40.1 |
| 9 | 19.466 | 2.94 | 1.84666 | 23.8 |
| 10 | −34.587 | (Variable) | | |
| 11 | ∞ | 1.20 | | |
| 12 | −233.884 | 1.94 | 1.78800 | 47.4 |
| 13 | −25.391 | 1.09 | | |
| 14 | 40.302 | 2.74 | 1.69680 | 55.5 |
| 15 | −18.763 | 1.20 | 1.67270 | 32.1 |
| 16 | −1222.568 | (Variable) | | |
| 17 | −38.346 | 1.22 | 1.84666 | 23.8 |
| 18 | −20.374 | 1.00 | 1.69100 | 54.8 |
| 19* | 57.221 | (Variable) | | |
| 20 | 34.413 | 5.15 | 1.60311 | 60.6 |
| 21 | −25.255 | 2.05 | | |
| 22 | −20.820 | 1.24 | 1.84666 | 23.8 |
| 23 | 483.717 | 17.69 | | |
| Image plane | ∞ | | | |

Aspherical surface data

Ninteenth surface

K = 0.00000e+000   A4 = −7.30784e−006   A6 = 1.17385e−008
A8 = −1.90930e−010

| Focal length | 53.73 |
|---|---|
| F-number | 3.50 |
| Half angle of field (degree) | 14.26 |
| Image height | 13.66 |
| Total lens length | 76.39 |
| BF | 17.69 |

| Magnification | ∞ | −0.5 | −1 |
|---|---|---|---|
| d5 | 0.93 | 4.19 | 8.29 |
| d10 | 8.52 | 5.25 | 1.16 |
| d16 | 1.53 | 7.18 | 13.34 |
| d19 | 12.97 | 7.32 | 1.15 |

Unit data

| Unit | First surface | Focal length |
|---|---|---|
| 1 | 1 | 24.13 |
| 2 | 6 | −15.75 |
| 3 | 11 | 21.63 |
| 4 | 17 | −37.48 |
| 5 | 20 | 284.09 |

(Numerical Embodiment 2)

Unit: mm

Surface data

| Surface number | r | d | nd | νd |
|---|---|---|---|---|
| 1 | 50.507 | 2.92 | 1.69680 | 55.5 |
| 2 | −75.650 | 0.15 | | |
| 3 | 21.575 | 3.84 | 1.69680 | 55.5 |
| 4 | −35.587 | 1.30 | 1.84666 | 23.8 |
| 5 | 70.999 | (Variable) | | |
| 6 | 96.332 | 1.00 | 1.91082 | 35.3 |
| 7 | 14.817 | 2.09 | | |
| 8 | −16.805 | 1.10 | 1.80610 | 40.9 |
| 9 | 17.099 | 2.51 | 1.84666 | 23.8 |
| 10 | −31.752 | (Variable) | | |
| 11 (Stop) | ∞ | 1.38 | | |
| 12 | −90.127 | 1.81 | 1.69680 | 55.5 |
| 13 | −23.402 | 0.20 | | |
| 14 | 33.635 | 2.89 | 1.69680 | 55.5 |
| 15 | −17.086 | 1.20 | 1.76192 | 26.5 |
| 16 | −56.766 | (Variable) | | |
| 17 | −43.867 | 1.47 | 1.84666 | 23.8 |
| 18 | −21.654 | 1.00 | 1.69680 | 55.5 |
| 19 | 46.687 | (Variable) | | |
| 20* | 39.884 | 5.75 | 1.58313 | 59.4 |
| 21 | −23.659 | 3.35 | | |
| 22 | −14.126 | 1.24 | 1.84666 | 23.8 |
| 23 | −42.348 | (Variable) | | |
| Image plane | ∞ | | | |

Aspherical surface data

Twentieth surface

K = 0.00000e+000  A4 = 2.69015e−005  A6 = 1.37498e−007
A8 = −7.75918e−010  A10 = 6.57048e−012

| Focal length | 46.39 |
|---|---|
| F-number | 3.50 |
| Half angle of field (degree) | 16.41 |
| Image height | 13.66 |
| Total lens length | 75.34 |
| BF | 16.08 |

| Magnification | ∞ | −0.5 | −1 |
|---|---|---|---|
| d5 | 0.93 | 4.60 | 8.98 |
| d10 | 8.47 | 5.97 | 1.17 |
| d16 | 1.24 | 6.92 | 13.50 |
| d19 | 13.43 | 7.66 | 1.19 |
| d23 | 16.08 | 15.99 | 16.30 |

Unit data

| Unit | First surface | Focal length |
|---|---|---|
| 1 | 1 | 24.44 |
| 2 | 6 | −14.91 |
| 3 | 11 | 19.35 |
| 4 | 17 | −36.32 |
| 5 | 20 | 186.65 |

(Numerical Embodiment 3)

Unit: mm

Surface data

| Surface number | r | d | nd | νd |
|---|---|---|---|---|
| 1 | 46.725 | 4.18 | 1.77250 | 49.6 |
| 2 | −135.826 | 0.16 | | |
| 3 | 28.108 | 5.89 | 1.60300 | 65.4 |
| 4 | −42.822 | 1.30 | 1.84666 | 23.9 |
| 5 | 107.365 | (Variable) | | |
| 6 | −165.424 | 1.00 | 1.83400 | 37.2 |
| 7 | 14.669 | 2.72 | | |
| 8 | −54.981 | 1.10 | 1.67270 | 32.1 |
| 9 | 15.271 | 3.48 | 1.92286 | 18.9 |
| 10 | 231.753 | (Variable) | | |
| 11 | ∞ | 2.10 | Aperture stop | |
| 12 | ∞ | 2.30 | Auxiliary stop (Flare-cut stop) | |
| 13 | 70.120 | 4.84 | 1.65160 | 58.5 |
| 14 | −28.502 | 0.20 | | |
| 15 | 53.095 | 5.02 | 1.71300 | 53.9 |
| 16 | −20.564 | 1.00 | 1.84666 | 23.9 |
| 17 | −80.025 | (Variable) | | |
| 18 | −60.163 | 1.20 | 1.63481 | 42.7 |
| 19 | 15.450 | 2.34 | 1.84666 | 23.9 |
| 20 | 37.962 | (Variable) | | |
| 21 | 93.043 | 1.20 | 1.84666 | 23.9 |
| 22 | 32.951 | 3.87 | 1.77250 | 49.6 |
| 23 | −92.375 | (Variable) | | |
| Image plane | ∞ | | | |

| Focal length | 58.00 |
|---|---|
| F-number | 2.92 |
| Half angle of field (degree) | 13.22 |
| Image height | 13.63 |
| Total lens length | 107.54 |
| BF | 34.50 |

| Magnification | ∞ | −0.5 | −1 |
|---|---|---|---|
| d5 | 1.50 | 5.21 | 10.22 |
| d10 | 10.67 | 6.96 | 1.95 |
| d17 | 1.50 | 4.85 | 14.94 |
| d20 | 15.45 | 2.24 | 2.00 |
| d23 | 34.50 | 44.37 | 34.51 |

Unit data

| Unit | First surface | Focal length |
|---|---|---|
| 1 | 1 | 31.37 |
| 2 | 6 | −16.22 |
| 3 | 11 | 20.96 |
| 4 | 18 | −27.80 |
| 5 | 21 | 66.45 |

TABLE 1

Relation between Numerical Embodiments and Conditional Expressions

| Conditional Expression | Numerical Embodiment 1 | Numerical Embodiment 2 | Numerical Embodiment 3 |
|---|---|---|---|
| (1), (2) | L2: −0.47  L4: −0.32 | L2: −0.47  L4: −0.33 | L2: −0.54  L4: −0.48 |
| (3) | L3: 0.40 | L3: 0.42 | L3: 0.36 |
| (4), (5) | L2: −0.29  L4: −0.70 | L2: −0.32  L4: −0.78 | L2: −0.28  L4: −0.48 |

TABLE 1-continued

Relation between Numerical Embodiments and Conditional Expressions

| Conditional Expression | Numerical Embodiment 1 | Numerical Embodiment 2 | Numerical Embodiment 3 |
|---|---|---|---|
| (6), (7) | L2: 3.37    L4: 1.16 | L2: 2.91    L4: 1.08 | L2: 3.47    L4: 1.12 |
| (8) | 0.45 | 0.53 | 0.54 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-096597, filed May 8, 2014, which is hereby incorporated by reference herein in its entirety.

What is claimed is:

1. An optical system including a plurality of lens units, in which an interval between adjacent lens units changes during focusing, the optical system comprising:
   a positive lens unit arranged closest to an object side;
   a first focus lens unit having a negative refractive power configured to move during focusing;
   a second focus lens unit having a negative refractive power configured to move during focusing; and
   an intermediate lens unit having a positive refractive power and arranged between the first focus lens unit having the negative refractive power and the second focus lens unit having the negative refractive power,
   wherein the first focus lens unit having the negative refractive power and the second focus lens unit having the negative refractive power are configured to move toward an image side during focusing on from a first object at infinity to a second object at a distance in which an image-to-object ratio is 1,
   wherein the following conditional expressions are satisfied:

$-0.80 < mn1/fn1 < -0.22$; and $-0.80 < mn2/fn2 < -0.22$, where fn1 represents a focal length of the first focus lens unit having the negative refractive power, fn2 represents a focal length of the second focus lens unit having the negative refractive power, mn1 represents a movement amount of the first focus lens unit having the negative refractive power during focusing on from the first object at infinity to the second object at a distance at which an image-to-object ratio is 1, and mn2 represents a movement amount of the second focus lens unit having the negative refractive power during the focusing on from the first object at infinity to the second object at a distance at which an image-to-object ratio is 1, wherein a sign of mn1 or mn2 is positive when a position of a corresponding focus lens unit that is in focus on the second object at a distance at which an image-to-object ratio is 1 is closer to the image side than a position of the corresponding focus lens unit that is in focus on the first object at infinity.

2. The optical system according to claim 1, wherein the following conditional expression is satisfied:

$0.2 < fp/finf < 2.0$, where fp represents a focal length of the intermediate lens unit, and finf represents a focal length of the optical system when being in-focus on the first object at infinity.

3. The optical system according to claim 1, wherein the following conditional expressions are satisfied:

$-1.0 < fn1/finf < -0.2$; and $-1.0 < fn2/finf < -0.2$, where fn1 represents a focal length of the first focus lens unit having the negative refractive power, fn2 represents a focal length of the second focus lens unit having the negative refractive power, and finf represents a focal length of the optical system when being in-focus on the first object at infinity.

4. The optical system according to claim 1, wherein the following conditional expressions are satisfied:

$1.0 < \beta inf1/\beta mod1 < 10.0$; and $1.0 < \beta inf2/\beta mod2 < 10.0$, where $\beta inf1$ represents a lateral magnification of the first focus lens unit having the negative refractive power when being in-focus on the first object at infinity, $\beta inf2$ represents a lateral magnification of the second focus lens unit having the negative refractive power when being in-focus on the first object at infinity, $\beta mod1$ represents a lateral magnification of the first focus lens unit having the negative refractive power when being in-focus on the second object at a distance in which an image-to-object ratio is 1, and $\beta mod2$ represents a lateral magnification of the second focus lens unit having the negative refractive power when being in-focus on the second object at a distance in which an image-to-object ratio is 1.

5. The optical system according to claim 1, wherein the following conditional expression is satisfied:

$0.1 < f1/finf < 1.0$, where f1 represents a focal length of the positive lens unit arranged closest to the object side, and finf represents a focal length of the optical system when being in-focus on the first object at infinity.

6. The optical system according to claim 1, wherein an interval on an optical axis between the first focus lens unit and the second focus lens unit is changed during focusing.

7. The optical system according to claim 1, wherein the optical system consists of, in order from the object side to the image side, the positive lens unit arranged closest to an object side, the first focus lens unit, the intermediate lens unit, the second focus lens unit, and a fifth lens unit having a positive refractive power.

8. The optical system according to claim 7, wherein the positive lens unit arranged closest to an object side and the intermediate lens unit are configured not to move for focusing.

9. The optical system according to claim 8, wherein the fifth lens unit is configured to move during focusing.

10. The optical system according to claim 9, wherein, during focusing, an interval on an optical axis between the positive lens unit arranged closest to an object side and the intermediate lens unit, an interval on the optical axis between the intermediate lens unit and the fifth lens unit, and an interval on the optical axis between the positive lens unit arranged closest to an object side and the fifth lens unit are changed.

11. An image pickup apparatus, comprising:
an optical system; and
an image sensor configured to receive an image formed by the optical system,
wherein the optical system comprises:
a positive lens unit arranged closest to an object side;
a first focus lens unit having a negative refractive power configured to move during focusing;
a second focus lens unit having a negative refractive power configured to move during focusing; and
an intermediate lens unit having a positive refractive power and arranged between the first focus lens unit having the negative refractive power and the second focus lens unit having the negative refractive power, and
wherein an interval between adjacent lens units changes during focusing, and the first focus lens unit having the negative refractive power and the second focus lens unit having the negative refractive power are configured to move toward an image side during focusing on from a first object at infinity to a second object at a distance in which an image-to-object ratio is 1,
wherein the following conditional expressions are satisfied:

$-0.80 < mn1/fn1 < -0.22$; and $-0.80 < mn2/fn2 < -0.22$, where fn1 represents a focal length of the first focus lens unit having the negative refractive power, fn2 represents a focal length of the second focus lens unit having the negative refractive power, mn1 represents a movement amount of the first focus lens unit having the negative refractive power during focusing on from the first object at infinity to the second object at a distance in which an image-to-object ratio is 1, and mn2 represents a movement amount of the second focus lens unit having the negative refractive power during the focusing on from the first object at infinity to the second object at a distance at which an image-to-object ratio is 1, wherein a sign of mn1 or mn2 is positive when a position of a corresponding focus lens unit that is in focus on the second object at a distance at which an image-to-object ratio is 1 is close to the image side than a position of the corresponding focus lens unit that is in focus on the first object at infinity.

* * * * *